United States Patent [19]
Minkus

[11] Patent Number: 5,309,174
[45] Date of Patent: May 3, 1994

[54] ELECTRONIC DISPLAY SYSTEM

[75] Inventor: Loren S. Minkus, Buffalo Grove, Ill.

[73] Assignee: Motorola, Inc., Schaumburg, Ill.

[21] Appl. No.: 664,509

[22] Filed: Mar. 5, 1991

Related U.S. Application Data

[63] Continuation of Ser. No. 287,532, Dec. 19, 1988, abandoned, which is a continuation of Ser. No. 108,860, Oct. 13, 1987, abandoned.

[51] Int. Cl.$^5$ ............................................. G09G 5/00
[52] U.S. Cl. ............................. 345/204; 340/825.44; 345/904
[58] Field of Search ............... 340/703, 715, 747, 789, 340/502, 504, 505, 825.44, 825.52, 825.54, 870.02, 870.13; 379/102, 104; 364/184; 371/34, 67, 67.1; 178/4.1 B, 4.1 C; 40/471; 345/204, 904

[56] References Cited

U.S. PATENT DOCUMENTS

| | | | |
|---|---|---|---|
| 3,094,682 | 6/1963 | Brosh et al. | 340/906 |
| 3,256,512 | 6/1966 | Pickett et al. | 340/909 |
| 3,614,727 | 10/1971 | Fritts | 40/471 |
| 3,959,776 | 5/1976 | Morley | 364/900 |
| 4,015,349 | 4/1977 | Dunne | 40/33 |
| 4,070,648 | 1/1978 | Mergenthaler et al. | 371/34 |
| 4,107,467 | 8/1978 | Johnson et al. | 379/104 |
| 4,342,029 | 7/1982 | Hofmanis et al. | 340/747 |
| 4,464,655 | 8/1984 | Bird | 340/715 |
| 4,477,809 | 10/1984 | Bose | 340/825.54 |
| 4,541,066 | 9/1985 | Lewandowski | 340/715 |
| 4,608,552 | 8/1986 | Boutonnat et al. | 340/870.13 |
| 4,628,313 | 12/1986 | Gombrich et al. | 340/870.02 |
| 4,697,243 | 9/1987 | Moore et al. | 364/184 |
| 4,775,857 | 10/1988 | Staggs | 340/715 |

FOREIGN PATENT DOCUMENTS

| | | |
|---|---|---|
| 0068093A2 | 4/1982 | European Pat. Off. . |
| 0147936A3 | 11/1984 | European Pat. Off. . |
| 2120820A | 1/1982 | United Kingdom . |

OTHER PUBLICATIONS

IBM Tech. Disclosure Bulletin, vol. 24, No. 12, May 1982 pp. 6309-6310.

*Primary Examiner*—Richard Hjerpe
*Attorney, Agent, or Firm*—Thomas G. Berry; R. Louis Breeden

[57] ABSTRACT

Disclosed is a remotely controlled display system in which various forms of messages may be remotely provided to a display, and information regarding the display and/or the message may be provided to the control location. The information provided to the control location may be status information regarding the status of the message or the message medium, which may be, for example, a billboard or other sign, or it may be the verification of the message(s) sent to the remote location for display.

19 Claims, 1 Drawing Sheet

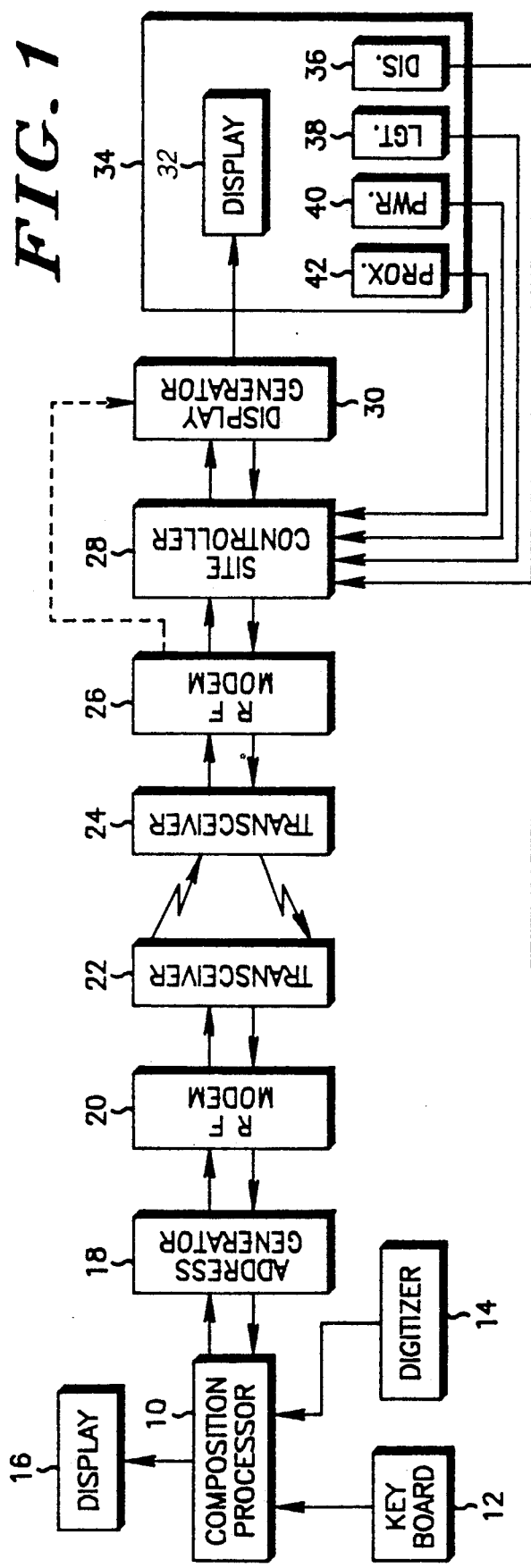
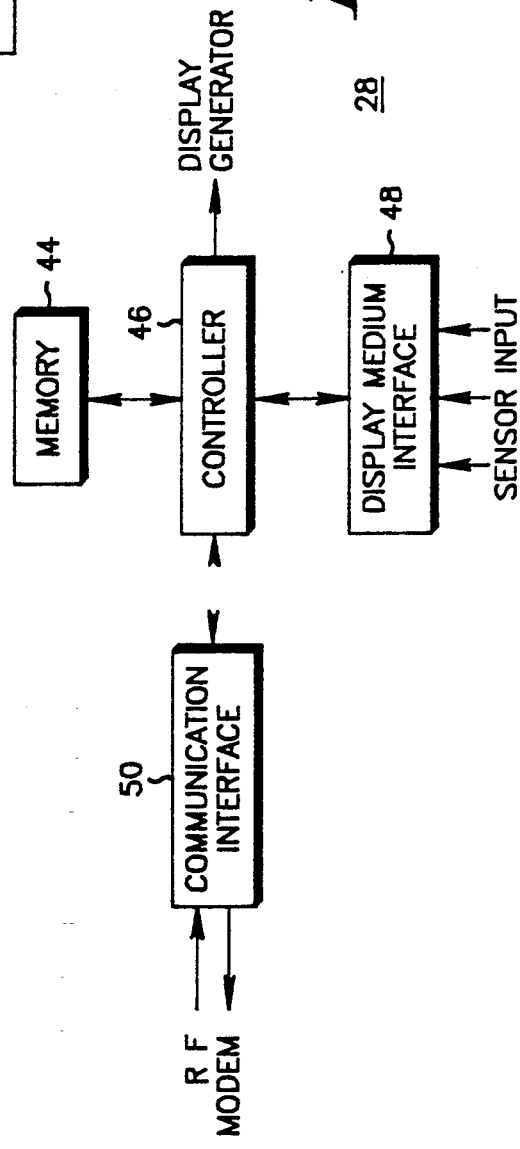

ELECTRONIC DISPLAY SYSTEM

This is a continuation of application Ser. No. 07/287,532 filed Dec. 19, 1988, now abandoned, which was a continuation of application Ser. No. 07/108,860 filed Oct. 13, 1987, now abandoned.

FIELD OF THE INVENTION

This invention relates to the remote control of displays, and more particularly to the remote control of displays wherein information regarding the controlled display is provided to the control location.

BACKGROUND

Prior art remote display controllers provided control from a control location to a remote display or sign by means of direct electrical connection or radio wave communication. In such systems, a signal was transmitted from the remote location to the display. One of several predetermined messages stored at the display was selected and displayed. In some cases, a provision was made to acknowledge receipt of the signal. The display, however, did not provide to the control location a positive response indicating that the correct message had been selected, or that the message had been properly displayed.

The prior art systems also offered no means for providing information to the control location relating to the status of the display itself, as distinguished from the displayed message.

OBJECTS AND SUMMARY OF THE INVENTION

It is, accordingly, an object of the instant invention to provide a remotely controlled display system in which various forms of messages may be remotely provided to a display, and information regarding the display and/or the message may be provided to the control location.

This and other objects and advantages of the invention are accomplished by a display system having a means for remotely controlling from a control location the presentation of a message on a remote display medium, comprising means for electronically communicating a message from the control location to the display medium, means responsive to the receipt of the message for displaying the message on the display medium, and means associated with the remote display medium for providing status information to the control location.

BRIEF DESCRIPTION OF THE DRAWINGS

FIG. 1 is a block diagram of a system according to the invention.

FIG. 2 is a block diagram of a site controller according to the invention.

DETAILED DESCRIPTION OF A PREFERRED EMBODIMENT

FIG. 1 shows a block diagram of a display system having a means for remotely controlling from a control location the presentation of a message on a remote display medium. A processor for composing a message is shown at 10 and is accessed by means of a keyboard 12 or a digitizer 14. Associated with processor 10 is a display screen 16 on which can be viewed the message as composed by the processor or as is stored in the memory thereof. The processor 10 may in practice be a general purpose digital computer, such as a personal computer now offered by a number of manufacturers, or may be a special purpose controller. A personal computer would have associated therewith a software package for generating messages or graphics from a keyboard input 12. An alternative data entry or composition means may be the digitizer 14, several types of which are commonly available, and which are used to enter into a computer coordinates from which a graphic design can be reproduced. Other inputs, such as facsimile for example, could also be used.

Within the processor 10 is a memory, which may be the main memory of a personal computer, of sufficient size to store the message or graphical composition to be displayed. While the organization of the memory will be such as to conveniently store the type of message desired, such a memory may be of the bit-mapped type, where the display screen 16 of the processor 10 is represented by a large number of discrete picture elements, or pixels, the illumination of selected ones of which form a text or graphic message or representation.

Connected to the composition processor 10 is an address generator 18 which is capable of accessing the message storage memory of the processor to cause the contents thereof to be read out of the memory, or to cause data to be read into the memory. In practice, the address generator may be a part of the processor 10, particularly in those cases where the processor is a general purpose digital computer. As data representing a composed message is read from the memory of the processor 10 which is located at a control location it is passed to a radio-frequency modem 20 for transmission by radio waves from a transceiver 22 to a transceiver 24 at a remote location.

The transceiver 24 is coupled to a second RF modem 26 located at the remote location and receives the transmitted data representing the message as stored in the memory of processor 10. From the RF modem 26, the message data is passed to a site controller 28, the details of which are shown in FIG. 2. The site controller comprises, among other things, a memory similar to the memory associated with the processor 10, for storing, preferably in bit-mapped fashion, the data representing the message to be displayed. A display generator 30 utilizes the data stored in the site controller memory to generate a pattern on a display 32 which is associated with a display medium 34 such as a billboard or other display medium. The display generator may be of conventional design and many apparatus are well known for taking the contents of a memory and displaying the same on displays of various kinds. The display itself may be in the form of an array of light bulbs, including a sub-array of of multi-colored light bulbs for each pixel to be represented. Alternatively the display may be alphanumeric, or may be of a "television" type. The display generator 30 would select, according to conventional techniques, one light of a specified color from each sub-array of the display to produce a color display in accordance with the data in the memory. Alternatively, the display generator itself may contain a memory sufficient for storing the transmitted data for display on display 32.

In a preferred embodiment, the display may be comprised of a plurality of pixels of a material known as PLZT, a display made from which is disclosed in U.S. Pat. No. 4,630 040, assigned to the assignee of the instant application. Such displays are available in both monochromatic and color versions.

The display medium itself, which may be a billboard only a portion of which is comprised of the display 32, may also comprise one or more sensors such as a display sensor 36 which is capable of detecting which of the display pixels are "on" and which are "off", a light sensor 38 which is capable of detecting whether the billboard main illumination system is operating, a power sensor 40, capable of determining that the billboard medium is being supplied with proper power, and a proximity sensor 42 for detecting possible intrusions onto the site of the display medium.

Each of the sensors 36, 38, 40, 42 may be connected to the site controller which, through an appropriate controller is able to transmit the status information generated by these sensors back to the control location via transceivers 24 and 22. This status information may be transmitted at a predetermined time or upon request from the control location. If the site controller is a general purpose digital computer, such as a personal computer, it is well within the skill of a system developer to program each of the computers to perform the functions enumerated. Sensors capable of performing the operations of the sensors described above are readily available, as is the software with which to interface these sensors to a general purpose computer.

In an alternative embodiment, the display generator 30 may be of such a design as to allow the generated display information to be "echoed" to the site controller for transmission to the control location such that the contents of the display, as executed, may be confirmed at the control location.

FIG. 2 shows a block diagram of a site controller 28 of FIG. 1. As previously noted, the site controller comprises a memory 44 for storing the data received from processor 10 representing a message to be displayed. The memory may also contain control programs to direct the operation of the display generator, particularly if the site controller includes a general purpose digital computer as the functional controller 46 thereof. In such a case, the memory 44 may be the main memory of such computer. A display medium interface 48 accepts inputs from sensors 36, 38, 40, 42 and may be interrogated by or may interrupt the processor 46 to provide the status information as needed by the control location by way of a communications interface 50. As previously noted, the controller either includes or is coupled to the display generator 30 in order to provide data to be displayed or to sense displayed data for confirmation to the control location.

The memory 44, whether or not it is a part of the main memory of controller 46, may be of such a capacity as to be capable of storing more than one message for display. In this case, a plurality of messages may be transmitted from the control location to the display location at one time for display on command from the control location or from a locally stored program sequence at different times. For example, several messages may be transmitted at night when loading on the RF network is light, for display at different times during the next day. It is within the skill of a programmer to program a digital computer which has an appropriate timing mechanism to generate the displays previously transmitted at any time subsequent.

In operation, an operator may compose a message or display on the screen 16 of the composition processor 10 in alphanumeric or graphic form, using computer generated graphics or pixel-generated graphics. A data representation of the message or display is stored in the memory of the processor for later transmission to the display medium at a remote location.

Subsequently, at the operators command or at the request of a processor at the remote location, the stored data representing the message or display is transmitted, via the RF modem 20 and transceiver 22 to a corresponding transceiver 24 and RF modem 26 at a remote location.

The data is then stored in the memory 44 of a site controller for presentation to a display generator 30 or for later use. A plurality of messages can be stored in the memory 44 for individual recall and display at a later time. On command from the control location, or at a predetermined time, the data from memory 44 is provided to the display generator 30 to actuate the display 32. At the same time, or at a later time, a representation of the stored message, the displayed message, or the contents of the display generator is provided to the site controller so that the control location can confirm that the proper message was received and/or displayed.

Additionally, the display medium itself, in a preferred embodiment a billboard, has associated therewith a number of functions which are desired to be monitored. For example, it is desireable for the control location to have information regarding the proper operation of the electrical supply to the billboard for lighting purposes. To this end, certain sensors 38, 40 are provided to monitor these functions and to report the status thereof back to the control location upon request, or at prescribed times, or in the event of malfunction. An intrusion detector, or proximity sensor, 42 may also be provided. Preferably these status monitors are coupled to the site controller in a known manner such that the information provided can be transmitted via the transceivers 22 and 24 to the control location.

Additionally, it is within the capability of the apparatus described herein to allow the lighting, for example of the display medium to be operated under the control of the control location. A sensing system such as is described above would then verify the accomplishment of the desired function.

While the invention has been described in terms of a preferred embodiment thereof, certain modifications may occur to those skilled in the art, which modifications fall within the invention as contemplated. It is intended that the scope of the invention be defined only by the appended claims.

I claim:

1. A display system including a display medium means having a display medium for displaying messages, and central processing means disposed at a remote location from said display medium means for initiating a message for display on said display medium, said display comprising:

first means for providing electronic communication over a transmission medium between the central processing means and remote display medium means, said first means being controlled to communicate a message from the central processing means to the display medium, second means disposed at the remote display medium means for receiving the message and for causing text or graphic characters representing the message to be displayed on the display medium in a manner capable of being interpreted by individuals viewing the display medium, and third means disposed at the remote display medium means for detecting the status of at least one operational parameter of displaying a message on the display medium which parameter relates to the proper display of the message on the display medium and for providing information representative thereof;

fourth means associated with the display medium for controlling the first means to electronically communicate the status information of the third means to the central processing means.

2. A display system as set forth in claim 1, wherein the third means includes means for monitoring the second means to provide status information relating to the correctness of the text or graphic characters representing the message caused to be displayed on the display medium.

3. A display system as set forth in claim 1, wherein the fourth means controls the first means to communicate the status information to the central processing means upon receipt of the message by the second means.

4. A display system as set forth in claim 1, wherein the fourth means controls the first means to communicate the status information to the central processing means upon request of the status information from the central processing means.

5. A display system as set forth in claim 1, wherein the fourth means controls the first means to communicate the status information to the central processing means at a predetermined time.

6. A display system as set forth in claim 1 wherein the central processing means includes means for composing a message comprising a processor for creating an alphanumeric message.

7. A display system as set forth in claim 1 wherein the central processing means includes means for composing a message comprising a processor for creating a graphic message.

8. A display system as set forth in claim 1 wherein the central processing means includes means for composing a message comprising a processor coupled to a digitizing means for creating a graphic message.

9. A display system as set forth in claim 1 wherein the central processing means further comprises means for storing a composed message for communication to the display medium means at a later time.

10. A display system as set forth in claim 1 wherein the central processing means includes means for generating a command for controlling a function in the operation of displaying the message on the remotely located display medium, and means for controlling the first means to communicate the command to the second means for implementation thereby.

11. A display system as set forth in claim 10 wherein the third means includes means for monitoring the second means to provide status information relating to the implementation of the command by the second means.

12. A display system as set forth in claim 1 wherein the second means includes means for receiving a plurality of messages and causing said text or graphic characters representing the received message to be displayed on the display medium in accordance with a predetermined schedule.

13. A display system as set forth in claim 12 wherein the third means includes means for monitoring the second means to provide status information relating to the proper display of the plurality of messages on the display medium in accordance with the predetermined schedule.

14. A display system as set forth in claim 1 wherein the third means includes a display sensor for detecting a malfunction in the display medium in connection with displaying the message and providing status information representative thereof.

15. A display system as set forth in claim 1 wherein the display medium means includes a source of illumination for the display medium; and wherein the third means includes an illumination sensor for detecting a malfunction in the source of illumination and providing status information representative thereof.

16. A display system as set forth in claim 1 wherein the display medium means includes a source of power for the display medium; and wherein the third means includes a power sensor for detecting a malfunction in the source of power and providing status information representative thereof.

17. A display system as set forth in claim 1 wherein the display medium means includes a sensor for detecting an intrusion within a proximity of said display medium means and for providing status information representative thereof.

18. A display system including a display medium means having a display medium for displaying messages, and central processing means disposed at a remote location from said display medium means for initiating a message for display on said display medium, said display comprising:

first means for providing electronic communication over a transmission medium between the central processing means and remote display medium means, said first means being controlled to communicate at least one message from the central processing means to the display medium, second means disposed at the remote display medium means for receiving and storing the message in a memory, and for causing text or graphic characters representing at least one of the messages stored in the memory to be displayed on the display medium for a time interval, and third means disposed at the remote display medium means for detecting the status of at least one operational parameter of displaying a message on the display medium during the time interval that the message is displayed, which parameter relates to the proper display of the message on the display medium and for providing information representative thereof;

fourth means associated with the display medium for controlling the first means to electronically communicate the status information of the third means to the central processing means.

19. A display system including a display medium means having a display medium for displaying messages, and central processing means disposed at a remote location from said display medium means for initiating a message for display on said display medium, said display comprising:

first means for providing electronic communication over a transmission medium between the central processing means and remote display medium means, said first means being controlled to communicate messages from the central processing means to the display medium, second means disposed at the remote display medium means for receiving and storing the message in a memory, and for causing text or graphic characters representing certain messages stored in the memory to be displayed on the display medium in accordance with a message display schedule with each displayed message being displayed for a time interval, and third means disposed at the remote display medium means for detecting the status of at least one operational parameter of displaying a message on the display medium during the time interval that the message is displayed, which parameter relates to the proper display of the message on the display medium and for providing information representative thereof;

fourth means associated with the display medium for controlling the first means to electronically communicate the status information of the third means to the central processing means.

* * * * *

UNITED STATES PATENT AND TRADEMARK OFFICE
CERTIFICATE OF CORRECTION

PATENT NO. : 5,309,174
DATED : May 3, 1994
INVENTOR(S) : Minkus

It is certified that error appears in the above-indentified patent and that said Letters Patent is hereby corrected as shown below:

Column 4, line 54, before "comprising" insert --system--.

Signed and Sealed this

Seventeenth Day of January, 1995

Attest:

BRUCE LEHMAN

Attesting Officer

Commissioner of Patents and Trademarks